United States Patent [19]

Leal et al.

[11] 4,121,287
[45] Oct. 17, 1978

[54] ALARM FILTERING IN A GROUND PROXIMITY WARNING SYSTEM

[75] Inventors: Jean-Claude Leal, Versailles; Henri Vannetzel, Bourg la Reine; Jean-Claude Grima, Chatillon; Guy Albert Jules David, Thiais, all of France

[73] Assignee: Telecommunications Radioelectriques et Telephoniques T.R.T., Paris, France

[21] Appl. No.: 810,896

[22] Filed: Jun. 28, 1977

[30] Foreign Application Priority Data

Jul. 1, 1976 [FR] France .................. 76 20044

[51] Int. Cl.² .............................................. G01C 5/00
[52] U.S. Cl. ................... 364/461; 340/27 R; 364/433; 364/572
[58] Field of Search .......... 235/150.2, 150.22; 340/27 AT, 27 R; 343/5 LS, 7 R, 7 TA, 7 A, 7 ED, 7 PF, 12 R, 12 A, 112 A, 112 CA; 73/178 R, 178 T; 244/175, 180, 183; 364/424, 428, 433, 460, 461

[56] References Cited

U.S. PATENT DOCUMENTS

| | | | |
|---|---|---|---|
| 3,230,525 | 1/1966 | Anema | 343/7 A |
| 3,245,076 | 4/1966 | Le Tilly et al. | 343/7 TA |
| 3,715,718 | 2/1973 | Astengo | 340/27 R |
| 3,934,221 | 1/1976 | Bateman et al. | 235/150.2 |
| 3,934,222 | 1/1976 | Bateman et al. | 235/150.2 |
| 3,947,809 | 3/1976 | Bateman | 343/7 TA |
| 3,958,219 | 5/1976 | Bateman et al. | 235/150.2 |
| 3,988,713 | 10/1976 | Bateman | 235/150.2 |
| 4,021,802 | 5/1977 | Litchford | 343/112 CA |
| 4,030,065 | 6/1977 | Bateman | 235/150.2 |
| 4,041,341 | 8/1977 | Hart | 343/7 TA |

*Primary Examiner*—Charles E. Atkinson
*Assistant Examiner*—Errol A. Krass
*Attorney, Agent, or Firm*—Frank R. Trifari; Daniel R. McGlynn

[57] ABSTRACT

A ground proximity warning system used by aircraft when unsafe flight configurations defined by specified flight warning mode envelopes are detected. The invention provides that alarm generation signals are not immediately given, but instead the continuing flight of the aircraft is monitored by an alarm filtering system. The filtering system uses independently variable maximum and minimum threshold levels, and filtering constants which can be incremented and or decremented as functions of the flight location of the aircraft and the specific warning mode envelope for suppressing false or unnecessary alarm generation. The filtering parameters may be varied independently for each flight warning mode. In addition, a priority-ordered series of audio warnings are provided so that warnings once started are completed in the absence of higher priority warnings, even if the warning conditions cease to exist. Low priority warnings which are interrupted by higher priority warnings are regenerated when the higher priority warnings have been completed.

7 Claims, 9 Drawing Figures

ALARM FILTERING IN A GROUND PROXIMITY WARNING SYSTEM

The invention relates to a ground proximity warning system for determining the proximity of an aircraft with respect to the ground utilizing flight positional input parameters, comprising means to calculate the position of the aircraft with respect to specified flight warning mode envelopes, means to compare said calculated position with the aircraft's actual position during successive sampling periods, and means to generate an alarm signal if the aircraft has penetrated said flight warning mode envelopes.

Systems of this type are used in aircraft, in order to improve the aircraft's safety margin in flight by alerting the flight crew whenever the aircraft enters predetermined unsafe flight configurations. The utilization of such systems in aircraft is increasing in importance and it appears likely that they will become a mandatory requirement for operation of aircraft in many countries.

In the past hardwired systems employing analog techniques have been used to compute the aircraft's position with respect to predetermined specified flight warning mode envelopes, to make the necessary comparisons with the aircraft's actual position and to output the relevant warning signals which could be used to generate appropriate audio and or visual signals. One such system utilizing analog techniques is described in U.S. Pat. No. 3,715,718 entitled "Ground proximity warning system utilising radio and barometric altimeter combination".

One object of the present invention is to provide a flexible alarm filtering system. The present invention is characterized in that the system further comprises means to filter the alarm conditions detected in said flight warning modes to generate or not generate alarm signals as a function of the continuing flight of the aircraft by maximum and minimum level means, whereby for each flight warning mode an associated value is incremented by a constant during each sampling period if its corresponding alarm condition is present, an alarm signal being generated when the maximum value is reached, said value being decremented by a constant when its magnitude is between the maximum and minimum levels and the corresponding alarm condition ceases to exist, and being reset to zero instantaneously when its magnitude is below the minimum level and the alarm condition ceases to exist.

In order to provide a flexible alarm system the computed alarm conditions are filtered, i.e., the time interval between the detection of an alarm conditon for a flight warning mode and the generation of a corresponding audio or visual warning to alert the flight crew is controlled by maximum and minimum levels so that momentary and non-dangerous penetration by the aircraft into a flight warning mode envelope will not generate unnecessary false warnings. This is achieved by providing separate flight mode alarm counters for each of the flight warning modes and by storing in a small cost effective PROM the separate constants, and minimum and maximum levels for each of the flight warning modes. The explicit filtering technique will be disclosed in a preferred embodiment of the invention.

Another object of the invention comprises means to alter the rate at which flight warning mode alarm conditions are sampled, that is the time interval between successive monitorings of the detection of alarm conditions. This is achieved by alteration of the acquisition rate of the analog input parameters so that future aircraft characteristics or additions of new flight warning modes requiring altered sampling rates can be easily accommodated.

Another object of the invention is to enhance flexibility by providing means to alter the maximum and minimum levels thus providing means to vary the filtering time between alarm detection and generation to suit different aircraft and terrain characteristics. This is achievable by reprogrammation or replacement of the small PROM holding the above parameters, without the need to alter the main program held in a larger PROM.

A further object of the invention is to provide additional flexibility by providing means to alter the constant of incrementation and or decrementation, thus altering the alarm filtering time constant for a flight warning to suit various aircraft and terrain characteristics, the constants being held in the easily alterable PROM.

A further object of the present invention is to provide even further flexibility by providing means to alter independently for each flight warning mode, the maximum and minimum levels, and the constants of incrementation and decrementation. Thus replacement or reprogrammation of the already mentioned PROM with the appropriate parameters for each flight warning mode permits maximum flexibility.

A still further object of the invention is to provide accurate information to the flight crew by an embodiment comprising means to allow an audio warning being generated to be completed in the event of the alarm generation condition causing it ceasing to exist during said generation, provided higher priority alarm generation conditions do not simultaneously exist. Certain flight warning modes require a "soft warning" in which the flight crew is informed of the borderline nature of a flight configuration. An audio warning without pre-emption in this case is desirable because even though immediate corrective action may not be necessary the aircraft status is accurately known.

A still further object of the invention is to enhance security by providing means to restart the generation of a lower priority audio warning which has been interrupted by higher priority audio warnings if the responsible lower alarm generation condition still exists when the higher priority alarm generation conditions have disappeared. This feature ensures that if the aircraft is in a "soft warning" configuration in one flight warning mode when a "hard warning+ higher priority configuration arises in another flight warning mode, that if the soft warning configuration still exists when the higher priority warning configuration has been corrected, the appropriate soft audio warning will be announced.

A final object of the present invention is to incorporate the already mentioned advantages by providing means to implement a preferred embodiment of the system under the control of a digital computer.

Figure 1:
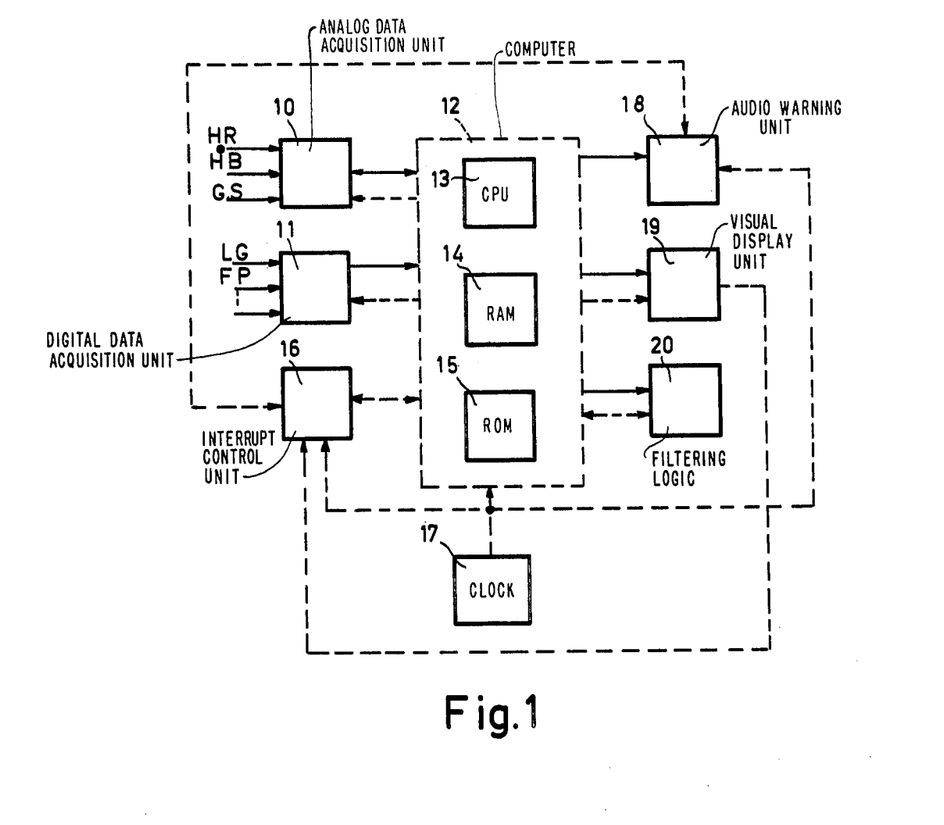
FIG. 1 is a functional block diagram representation of a ground proximity warning system which incorporates a digital computer.

Further detailed features and advantages of the invention will become apparent in the disclosure of a preferred embodiment and from the figures in which:

FIG. 1 shows a functional block diagram of a ground proximity warning system using a digital computer as the control element, its principal purpose being to provide an explanatory background to the present invention.

In FIG. 1 the central digital computer 12 comprises the PACE 16 microprocessor 13, which is designed in P channel metal oxide semiconductor (PMOS) technology with a 16 bit wide instruction and data path, an instruction set of 45 microprogrammed instructions, RAM semiconductor memory 14 with a 1 microsecond cycle time available in 256 16 bit word increments, and PROM semiconductor memory 15 with a 1 microsecond cycle time available in 512 word increments. A maximum of 32 kilowords (KW) of various combinations of RAM and PROM may be connected. All the above elements are connected on a general input/output bus, not shown in FIG. 1. A master clock 17 with a basic frequency of 2 MHz provides the synchronization signals necessary to control the functioning of the ground proximity warning system.

Under control of 12 the functional block 10 performs the acquisition, input filtering, level adaptation and conversion to digital form a fixed number of times per second of the flight input analog parameters, radio altitude $H_R$, barometric sink rate $H_B$ and glide slope deviation error GS. The functional block 11 performs the acquisition and level adaptation of certain digital inputs such as landing gear position LG, and flap position FP which are used in conjunction with the input parameters supplied by 10 to compute the aircraft position and to sequentially compare during each sampling period the computed position with reference flight warning mode envelopes held in 15, the computations and comparisons being executed by 12. If the aircraft has penetrated one or more flight warning mode envelopes the corresponding alarm conditions are recorded in a buffer register in 14. During subsequent sampling periods the alarm condition for each flight warning mode is monitored by 12 and filtered according to the filtering algorithm executed by the filtering logic 20 which independently controls the time interval and conditions under which a signal to generate an alarm is given for each flight warning mode. The functional block 16 contains the circuitry necessary to control via interrupts to 12 and commands to 18 the generation of audio warnings which are generated by functional block 18 after output level adaptation and conversion to analog form of audio warning sequences stored in digital form in 15. The functional block 19 performs the output adaption and visual display on a display panel of flight warning mode status under control of 12, and also transmits to 16 the flight warning mode alarm generation signals. All the above described functions are controlled by a program permanently stored in 15 and executed by 13. The RAM 14 is used as a working area for performing computations and for temporary storage. In FIG. 1 the solid lines between functional blocks represent data paths and the broken lines control paths, while the arrows represent the direction of information transfer.

Figure 2:
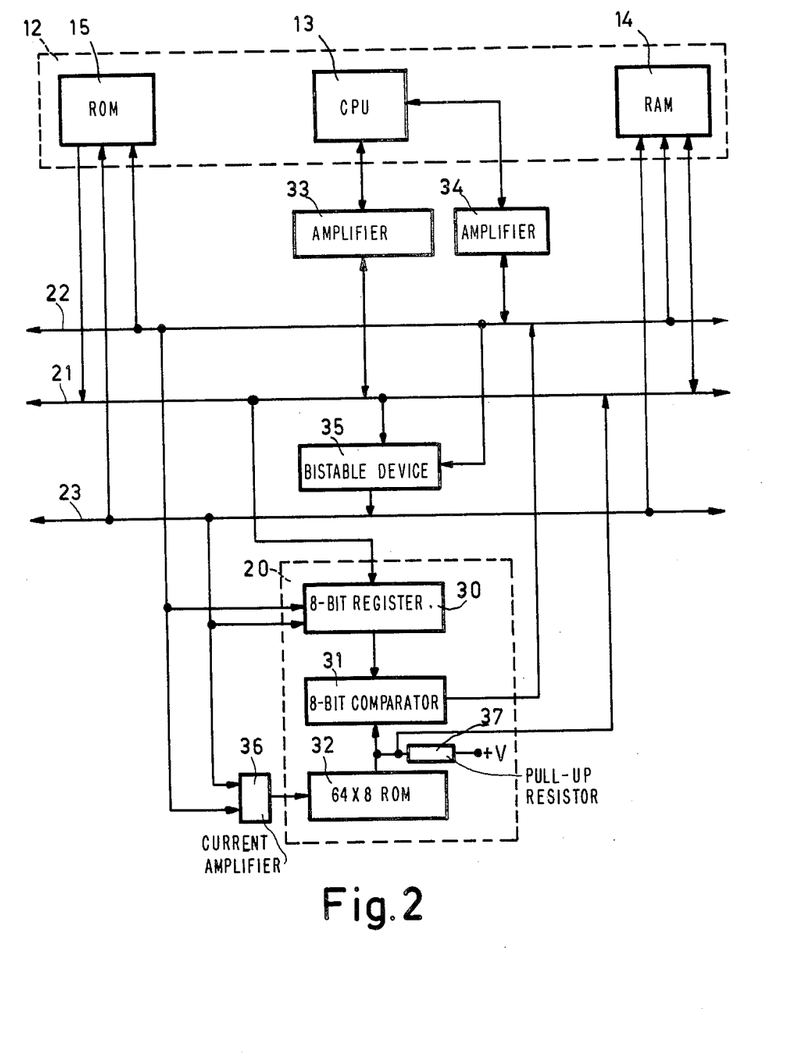
FIG. 2 is a functional diagram of a preferred embodiment of the flight warning mode alarm filtering system.

FIG. 2 is a functional block diagram of a preferred embodiment of the alarm filtering. In this embodiment, 14 comprises 256 words and 15 2K words, of which 1 K is used by the control program, ¼ K by the audio warning generation data and ¼ K is available for future expansion.

To obtain the best cost/performance trade offs possible with commercially available circuits an intermixing of technologies requiring suitable interfaces is used. Thus the interface 33 provides interfacing between 13 and the input/output bus 21, while interface 34 provides interfacing between 13 and the control bus 22. Interfaces 33 and 34 are comprised of amplifiers which convert complementary metal oxide semiconductor (CMOS) inputs from 21 and 22 respectively to MOS inputs compatible with 13, while MOS outputs from 13 are converted to CMOS compatible outputs used on 21 and 22. Interfaces 33 and 34 are 16 and 6 bits wide respectively. The data bus 21 is used to transfer data to and from various functional blocks while the control bus 22 is to used to provide conditional control information and to control the transfer of data within the system. The addressing logic 35 comprises a 16 bit register composed of D type CMOS bistable elements together with the necessary decoding logic. It receives its information via 21 under control 22 and its decoded output is transmitted on the address bus 23. It is connected to various functional blocks as shown in FIG. 2.

The alarm filtering logic 20 comprises an 8 bit register 30, an 8 bit comparator 31 and a 64 word × 8 bits PROM 32. An 8 bits level of accuracy is found to be sufficient but can be extended to 12 or 16 bits if necessary. Register 30 is made up of clocked D type latches in CMOS technology and is loaded from 14 under control of 13. Its output forms one input to 31 which is made up of two 4 bit comparators in CMOS connected in cascade. The second input to 31 is the output from 32. The result of the comparison in 31 is available to 13 as a ≧ or < jump condition (JC). PROM 32 is a 64 word × 8 bits bipolar memory which holds the incrementation constant (IK), decrementation constant (DK), maximum level value (ML) and minimum level value (MnL) for each flight warning mode. In the present embodiment five flight warning modes are used therefore more than one set of values can be stored for each flight warning mode, alternately storage space is available for future expansion. Interface 36 consists of current amplifiers which interface 22 and 23 to 32, while an open collector output with a pull up resistor 37 connects each output of 32 to 21 and 31. The connections for 20 are as shown in FIG. 2.

A detailed description of the alarm filtering algorithm follows according to the preferred functional embodiment of FIG. 2. A counter for each of five specified flight warning modes is held in 14. When an alarm condition is detected by a comparison of the computed aircraft position to the reference flight warning mode envelope a bit is set to 1 (ST1) in a buffer register in 14. The buffer register is scanned and as a consequence a sequence of actions is initiated by the control program in 15 and executed by 13 in the various functional blocks. The contents of the flight warning mode counter (FWMC) initially zero are loaded from 14 into 30. The relevant minimum level value in 32 is next read out by selecting its address and clocking its contents into the output buffer of 32. The two 8 bit outputs from 30 and 32 are compared (:) in 31 and the results of the comparison transmitted to 13 as ≧ or < jump condition. If the contents of 30, (30) ≧ the minimum level, the maximum level is next read from 32 and a comparison between it and the contents of 30 again carried out in 31. If the contents of 30 ≧ the maximum level the jump condition transmitted to 13 causes initiation of the relevant alarm generation signal. A flight mode warning counter is not allowed to be increment beyond the maximum level. If the comparison between contents of 30 and the minimum level results in the contents of 30 < the minimum level, the incrementation constant is selected from 32 and input to a working register in 14 where it is added to the contents of the flight warning mode counter. If the comparison between the contents of 30 and the maximum level results in contents of 30 < the maximum level, the counter is incremented as before.

When the comparison between the computed aircraft position and the reference flight warning mode envelope does not reveal an alarm condition, a different sequence of actions occurs. The relevant alarm condition bit in the buffer register in 14 is reset to zero (RTZ), and as already described the contents of 30 compared with the minimum level. If the contents of 30 ≧ the minimum level, the decrementation constant is selected from 32 and sent to 14 where it is substracted from the contents of the flight warning mode counter. If the contents of 30 < the minimum level the resulting jump condition to 13 causes the flight warning mode counter to be immediately reset to zero.

Figure 3:
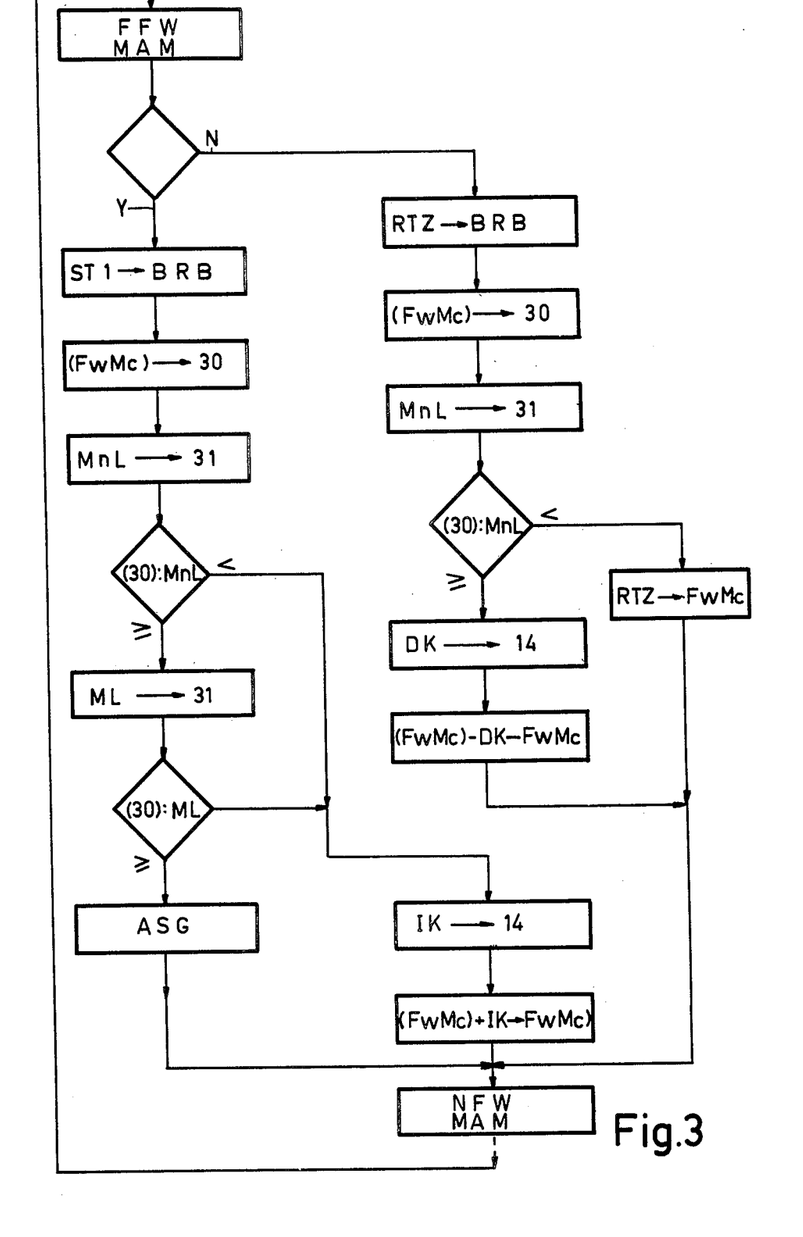
FIG. 3 is a flow diagram illustrating the functioning of the alarm filtering system of FIG. 2.

The completion of the filtering algorithm for a flight warning mode results in sequential monitoring of other flight warning modes in a manner similar to that described and a return to the first flight warning mode after completion of monitoring of the last. Thus the alarm condition for each flight warning mode is repeatedly scanned and filtered at specified time intervals. The sequences which occur during alarm filtering are illustrated in the flow diagram of FIG. 3.

Thus it can be seen that various combinations of constants, and maximum and minimum levels are possible to give optimum filtering times for each flight warning mode.

Figure 4:
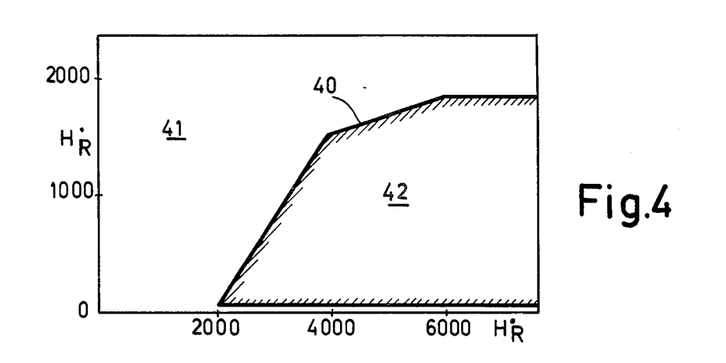
FIG. 4 is a graphical representation of a flight warning mode envelope.
Figure 5:
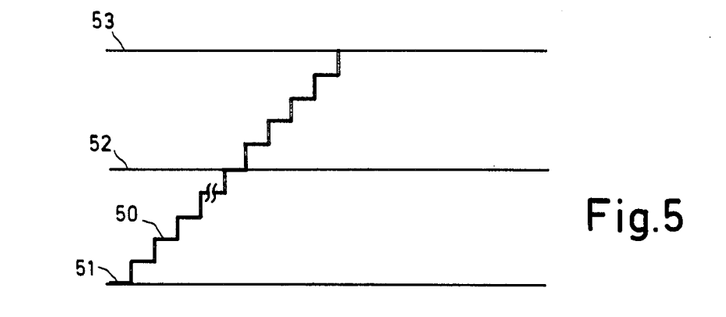
FIG. 5 illustrates alarm filtering in graphical form.
Figure 6:
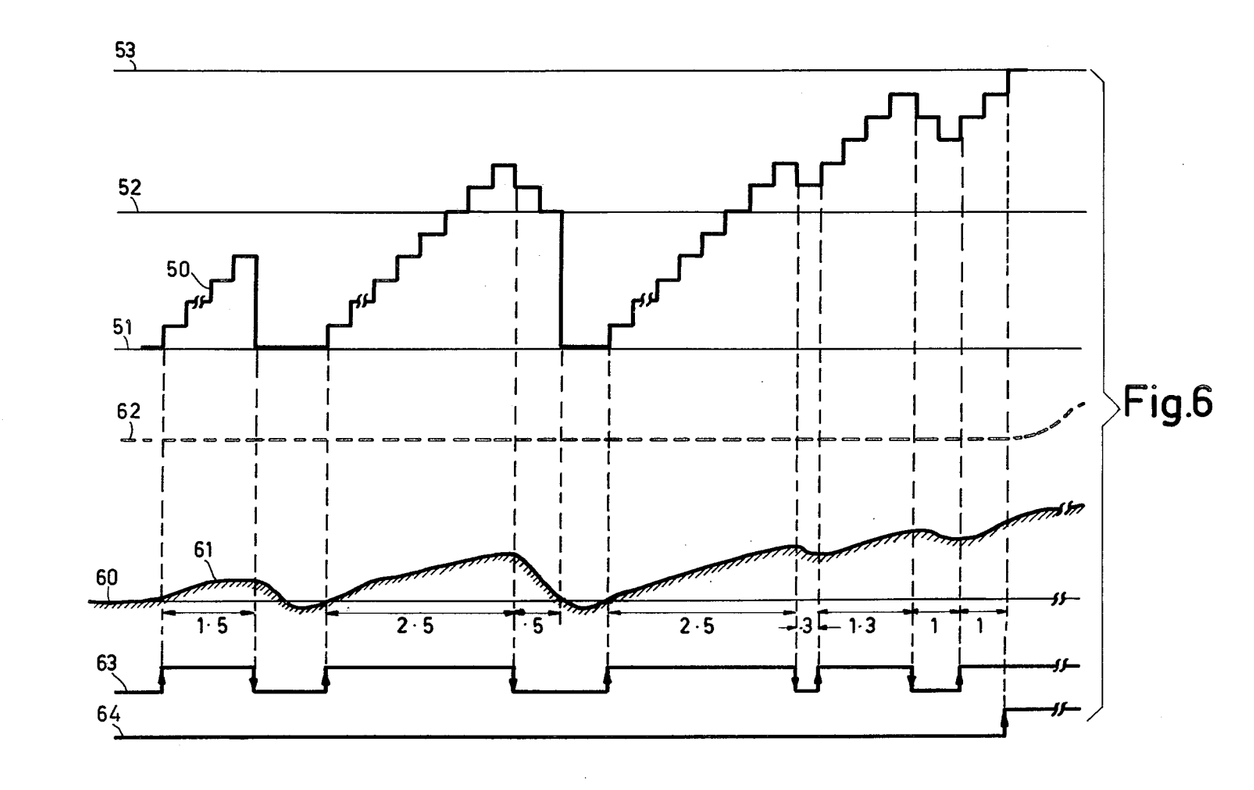
FIG. 6 illustrates in graphical form alarm filtering of a flight warning mode with respect to terrain characteristics.

The significance of the alarm filtering in minimizing false alarms is illustrated graphically with the aid of FIGS. 4, 5 and 6. FIG. 4 shows a flight mode warning envelope 40 which defines excessive aircraft closure rate to terrain in feet per minute ($H_R$) as a function of the aircraft height above terrain or radio altitude in feet $H_R$. Outside 40, that is in the area 41 the aircraft is in a safe configuration, while penetration into 42 will cause the ground proximity warning system to register an alarm condition and the alarm filtering system eventually to generate a warning if the penetration is dangerous.

FIG. 5, which is not drawn to scale, shows the minimum alarm filtering time to cause generation of a warning for a dangerous aircraft penetration into 40. Here 51 represents the no alarm condition level with the flight mode counter at zero, 52 represents the minimum level value and 53 the maximum level value. If 52 has a value of 120, 53 a value of 240, the incrementation and decrementation constants are each 2 and the sampling rate for each flight warning mode is 30 times per second the minimum alarm filtering time in the case of a dangerous aircraft penetration will be 4 seconds as shown by 50 which represents the contents of the flight warning mode alarm counter during successive sampling periods.

FIG. 6 which is not drawn to scale illustrates graphically how the alarm filtering functions with respect to the flight warning mode envelope shown in FIG. 4. In FIG. 6, 50, 51, 52 and 53 have the same meaning and values as in FIG. 5, 60 represents a base terrain height, below which no alarm conditions are detected for the flight path shown, 61 represents the terrain profile and 62 the flight path of the aircraft. It is assumed that the upward slope of the terrain 61 above the base line height 60 i.e. the closure rate, is sufficient to cause an alarm condition immediately as shown in FIG. 6. In reality the exact sampling period during which an alarm condition is detected is dependent on aircraft height above terrain $H_R$, and a combination of aircraft speed and terrain slope $H._R$. In FIG. 6, 50 follows the terrain profile until 53 is reached and an alarm signal generated as shown by the positive going edge of 64, causing the aircraft to climb as a result of corrective action. The periods during which alarm conditions are registered are shown by the positive levels of 63, the negative levels show the periods during which no alarm conditions exist. Because 50 is decremented but not reset to zero during the no alarm conditions above 52 caused by negative closure rates, the alarm generation signal is given in 1 second instead of 4 seconds. Thus the alarm filtering is able to suppress false alarm generation in instances of non-dangerous aircraft penetration into a flight warning mode envelope while at the same time closely following the terrain profile so that an alarm generation signal is quickly given in the event of dangerous aircraft penetration.

Other flight warning mode alarm conditions can also be independently filtered in a manner similar to that described. Terrain characteristics can be taken into account to suit each flight warning mode by altering the slope of 50 and or changing the values of 52 and 53.

Figure 7:
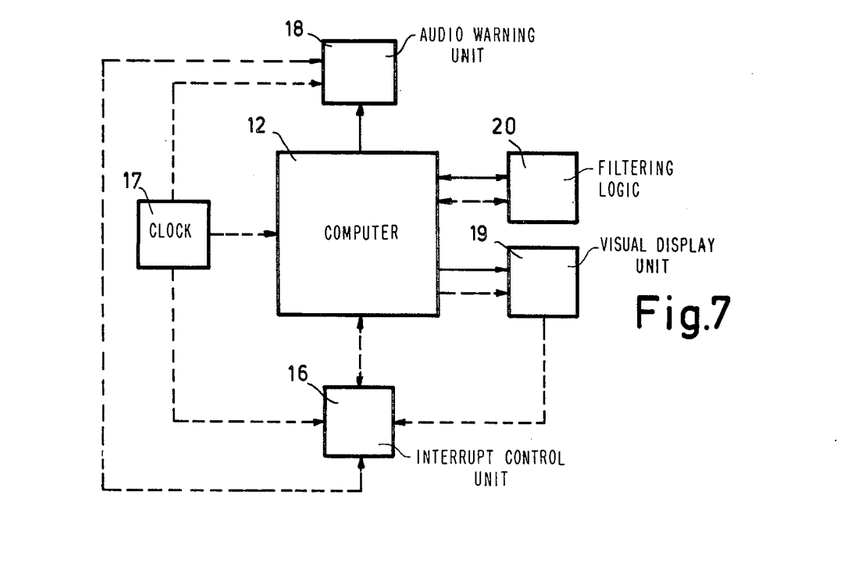
FIG. 7 is a function block diagram representation of the audio warning generation control system.

FIG. 7 is a functional block diagram representation of the audio warning generation control system. The functional blocks and control and data paths are as described for FIG. 1. The alarm generation signals created after filtering by 20 when flight warning mode envelopes have been penetrated by an aircraft are loaded into a buffer register in 19 via the data bus and under control of 12. In addition to using the alarm generation signals for visual display of the flight warning mode status, 19 also transmits the alarm generation signals to 16. In 16 a number of functions are performed. The priority of the alarm generation signals are determined, interrupts are sent to 12 to read out the appropriate audio storage and start commands are sent to 18 to generate the appropriate audio warning. Finish of audio warning signals from 18 are taken into account by 16 to determine the sequence of actions to follow. The master clock system 17 provides synchronization signals at different frequencies to 12, 16 and 18.

Figure 8:
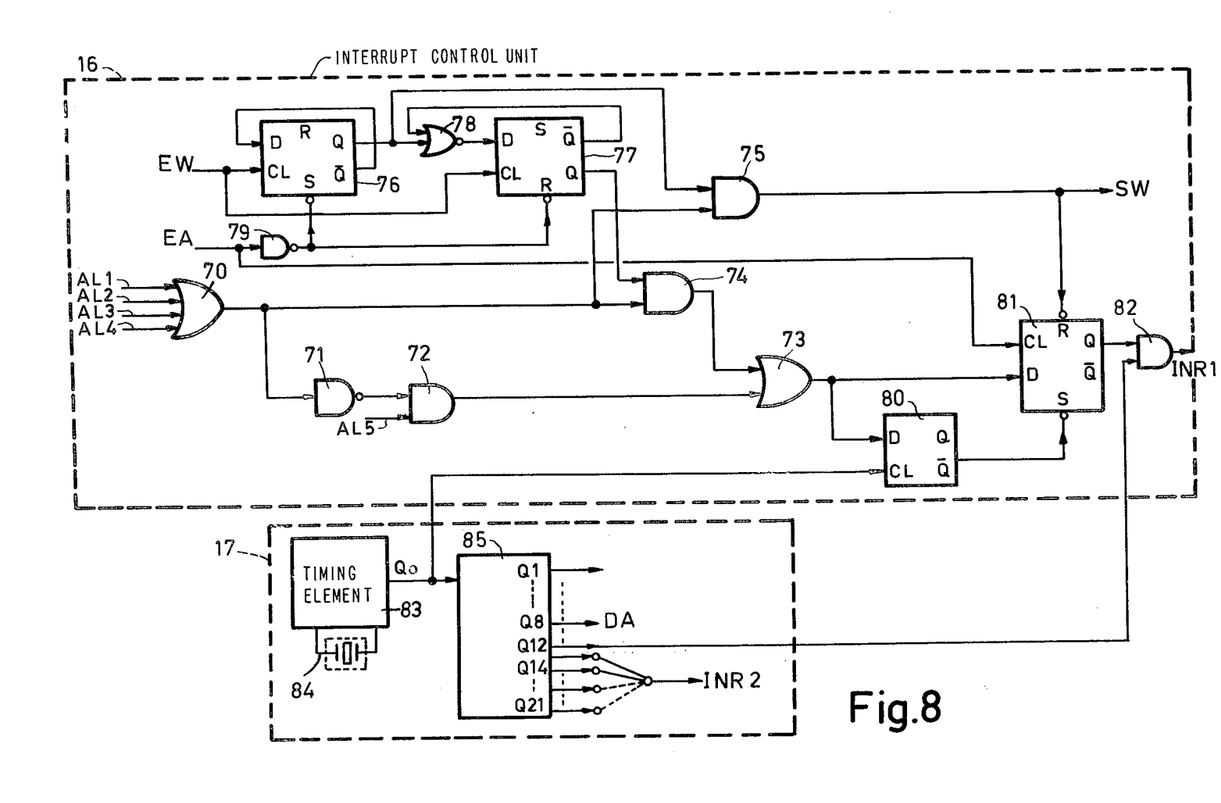
FIG. 8 is a functional diagram of a preferred embodiment of the audio warning generation control system of FIG. 7 incorporating interrupt and priority control functions and a master clock system.

FIG. 8 is a functional diagram of a preferred embodiment of the interrupt and priority control functional block 16, and the master clock system 17. The alarm generation signals AL1 to AL4 for flight warning modes 1 to 4 are transmitted by 19 and connected to OR gate 70 as they are all at the same priority level. In addition certain flight modes are mutually exclusive. Alarm generation signal AL5 for flight warning mode 5 which is a glide slope deviation alert, is of a lower priority and is connected to AND gate 72. The audio warnings which are controlled by the circuitry of FIG. 8 are a high priority audio warning "WHOOP WHOOP" followed immediately by the announcement "PULL UP" generated when a ground proximity situation occurs, and a lower priority audio warning "GLIDE SLOPE" generated when a slide slope deviation error occurs. Both warnings are generated by 18.

When the lower priority alarm AL5 is active and alarms AL1 to AL4 inactive the AND gate 72 is enabled and a logic 1 on the D input of a "D" type bistable 80 is clocked by the 2 MHz Qo output of the system timing element 83. As a result the $\bar{Q}$ output of 80 goes negative and sets the bistable 81 which in turn enables AND gate 82 permitting the signals generated by Q 12 output of the frequency divider 85 to be applied to the microcomputer 12 as the interrupt INR 1. This interrupt generated at a frequency of 488. 28125 Hz (2 MHz ÷ 4096) is used to read out, under control of 12, the digitally encoded audio data stored in PROM 15. The Q8 output DA of 85 generated at a frequency of 7812.5 Hz (2 MHz ÷ 256) is used to delta modulate the audio data transmitted by 12 to 18 in order to generate the audio message "GLIDE SLOPE". The message is repeated as long as AL5 is active because bistable 82 is set and gate 82 enabled in this condition.

If during the generation of GLIDE SLOPE, AL5 is deactivated bistable 80 will be reset by the next clock pulse it receives, however its $\bar{Q}$ output going positive does not effect the state of bistable 81 and therefore gate 82 remains enabled allowing interrupt INR 1 to be generated and thus the audio warning "GLIDE SLOPE" to be completed. On completion of "GLIDE SLOPE" an end of audio message signal EA from 12 clocks bistable 81 which is now reset, because its D input is logic 0. This in turn disables AND gate 82 and inhibits generation of INR 1.

If any one of the alarm generation signals AL1 to AL4 becomes active during generation of "GLIDE SLOPE", AL5 is instantaneously inhibited by a logic 0 on AND gate 72, gate 71 inverting the logic 1 generated by OR gate 70. Bistables 76 and 77 together with NOR gate 78 and NAND gate 79 form a 3 position counter. The 3 values assumed by the Q outputs of bistables 76 and 77 are 10, 00 and 01. The initial reset position of the counter is always 10 because at the end of an audio message the EA signal from 18 sets 76 and resets 77. Activation of any one of AL1 to AL4 therefore enables AND gate 75, which generates a start "WHOOP" signal SW to the "WHOOP WHOOP" generator of 18 and at the same time resets bistable 81 thus inhibiting further generation of audio messages via INR1.

The first "WHOOP" is generated by 18 under control of the DA signals from the Q8 output of frequency divider 85 and on its completion 18 sends an end of whoop signal EW to 16 where it is used to clock the counter bistables 76 and 77 which now assume the value 00. As AND gate 75 is still enabled the SW output causes a second "WHOOP" to be generated and the end of whoop signal EW. On completion of this second "WHOOP" again clocks counter bistables 76 and 77 which now take the value 01. As a result AND gate 75 is blocked inhibiting further "WHOOP" generation signals SW, while AND gate 74 is enabled and generates a logic 1 on the D input of bistable 80 via OR gate 73. As described above bistable 80 is set by the next clock pulse, in turn setting bistable 81 and therefore permitting generation of interrupt INR 1. Thus the audio message "PULL UP" is generated in a similar manner to that described for "GLIDE SLOPE". At the end of "PULL UP" the end of audio message signal EA resets bistable 81 thus inhibiting interrupt INR 1 and therefore further generation of audio messages. If any one or more of AL1 to AL4 are still active the "WHOOP WHOOP PULL UP" sequence will be repeated for as long as they are present because at the end of each sequence the counter bistables 76 and 77 are reset to value 10 by the end of audio signal EA. The system is therefore positioned to restart the audio sequence if anyone of AL1 to AL4 exists.

If at the end of the "WHOOP WHOOP PULL UP" sequence AL5 is still active a "GLIDE SLOPE" audio warning will automatically be generated. The alarm generation conditions for each flight warning is also stored in RAM 14 and therefore the microcomputer 12 is able to use the interrupt INR 1 to output digital data for the correct audio warning to the audio warning generation system 18.

The master clock system 17 consists of a system timing element 83 which produces a 2MHz output Qo from a 4 MHz crystal oscillator 84. The 2 MHz output Qo is used to clock bistable 80 and to drive the PACE 16 microcomputer 12. Qo is also used by a frequency divider 85 which consists of three 7 stage binary counters in cascade to produce a number of lower frequency clock outputs. The post important of these are Q8, used to delta modulate the digital audio data for generation of the audio warnings, and Q12 used to generate interrupt INR1 to read out the digital audio data from PROM 15. Additionally Q14 at a frequency of approximately 122 Hz (2MHz ÷ 16384) or a period of 8.192.milliseconds is used to generate interrupt INR2 which is utilised in the acquisition of the input analog parameters by the ground proximity warning system. Acquisition is performed once every 4 interrupts at a rate of approximately 30 per second. By means of a strap connection, as shown in FIG. 8, INR2 can be connected to different Q outputs of 85. For example connection to Q13 would change the INR2 interrupt generation rate to approximately 240 Hz with a consequent acquisition rate of 60 per second, while connection to Q15 would change the INR2 interrupt generation rate to approximately 60 Hz and the subsequent acquisition rate to 15 times per second. As each flight warning mode is monitored once per input parameter acquisition, alteration of the acquisition rate results in alteration of the monitoring or sampling rate for each flight warning mode.

It is pointed out that the use of a digital computer is not central to the utilisation of the interrupt and priority control system for audio warning generation disclosed by FIG. 8. The system can be applied to ground proximity warning systems incorporating control means other than a digital computer. It is apparent that the alarm generation signals and end of audio message signals can be supplied to the system by other means, while the outputs generated by the control system can be utilised by other non-digital computer means.

It is apparent that one specific embodiment of alarm filtering in ground proximity warning systems using a digital computer has been disclosed. However a digital computer is not necessary to the invention. A more generalised embodiment of alarm filtering in ground proximity warning systems in which the means to detect the alarm conditions are not specified will now be disclosed.

Figure 9:
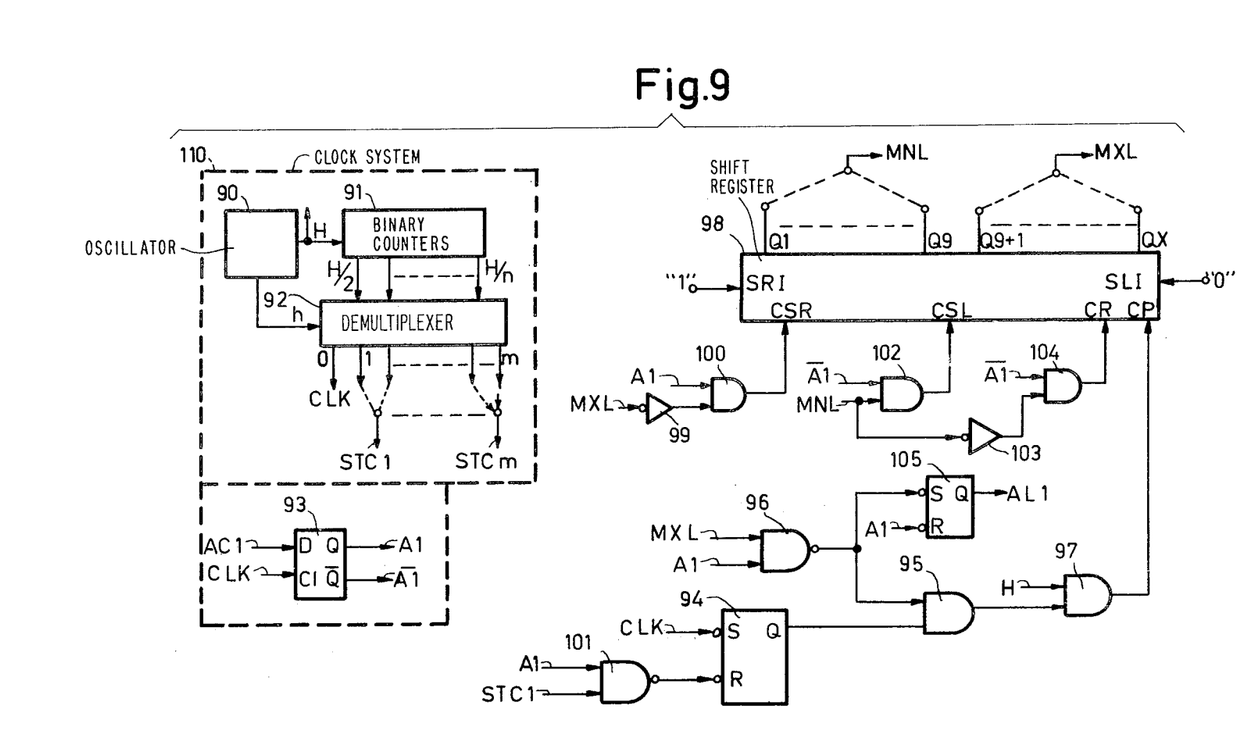
FIG. 9 is a functional block diagram of a generalised implementation of the alarm filtering system represented in FIG. 2.

FIG. 9 is a functional block diagram of such a generalized alarm filtering system. The functional block 110 represents a clock system in which an oscillator 90 generates output clocks at frequencies of H and h Hz, being twice the frequency of H. Clock H is applied to 91 which is composed of one or more cascaded binary counters to form an $n$ stage counter generating $n$ clocks at frequencies from $H/2, H/4$, to $H/n$ Hertz. An $n$ to $m$ way demultiplexer 92 consisting of one or more demultiplexer stages connected together is used to produce $m$ clock outputs so that each of the $n$ outputs of 91 is reproduced $m/n$ times. The clock $h$ strobes 92 to produce the required outputs. The clock frequency CLK is the lowest frequency in the system and is reproduced every time counter 91 is reset. CLK is used as the sampling frequency in the alarm filtering system, being used to monitor the state of a flight warning mode alarm condition. Thus the sampling rate can be altered by altering the clock frequency H. The STC1 to STC$m$ outputs are used to define the constants of incrementation and decrementation for flight warning modes 1 to $m$. Their use will become clear in the description to follow. By means of a strap connection different outputs of 92 can be connected to STC outputs allowing the constants to be changed. At least $m$ flight mode warning filtering stages can be driven by clock system 110.

Alarm filtering for a flight warning mode is described. The flight warning mode alarm condition AC1 is monitored and clocked into bistable 93 as A1 by the sampling frequency CLK, which simultaneously sets bistable 94. Initially AND gate 97 is enabled, thus AND gate 95 is also enabled, in turn allowing the positive pulses of clock H through AND gate 97 to the clock pulse input CP of a $x$ bit shift register 98 which is composed of one or more shift register stages. The shift right input SRI of the shift register 98 is connected to a logic 1 causing 1's to be shifted right into the register when a shift right command is applied to input SRI. Similarly the shift left input SLI is connected to a logic 0 causing 0's to be shifted left into the register when a shift left command is applied to input SLC. A strap connection is made between the minimum level MNL and any one of the data outputs Q1 to $Q_q$ of the shift register 98, similarly the maximum level MXL is connected to any one of data outputs Qq + 1 to Qx. Thus the minimum and maximum filtering levels can be altered.

The maximum level MXL (0 in this case) after inversion by inverter 99 together with alarm condition A1, active in this case, enables AND gate 100 which in turn enables the shift right command input SRI. As a result logic 1's are shifted right into the shift register 98 under control of clock H applied to the clock pulse input CP until the stop clock input STC1 in conjunction with A1 enables NAND gate 101, which in turn causes bistable 94 to be reset and AND gates 95 and 97 to be disabled, thus inhibiting the application of clock H to the shift register 98.

The shift register 98 remains in this condition until the next sampling clock CLK causes a repetition of the above described actions, provided the alarm condition A1 still exists. When the maximum level MXL is reached after successive sampling periods, MXL goes to logic 1 disenabling the shift right command input SRC via AND gate 100 and simultaneously blocking the application of clock H to the shift register 98 by also disenabling AND gates 95 and 97 through NAND gate 96 and setting the alarm generation signal AL1 on bistable 105. The alarm generation signal AL1 may then be utilized by the ground proximity warning system to generate the appropriate warning, Bistable 105 is reset when A1 is deactivated.

If alarm condition AC1 ceases to exist A1 will go negative and $\overline{A1}$ positive at the next sampling clock CLK applied to bistable 93. If the minimum level MNL has already been exceeded, i.e. is logic 1, MNL and $\overline{A1}$ will enable AND gate 102 causing the shift left command input SLC to be activated. The application of clock H to the clock pulse input CP of the shift register 98 will cause a left shift of 0's until inhibited by the arrival of stop clock input STC 1. When sufficient left shifts of 0's have occurred to cause minimum level MNL to go to 0, MNL after inversion by inverter 103 and in conjunction with $\overline{A1}$ enables AND gate 104 causing the shift register clear input CR to be activated and the shift register to be cleared to 0.

The generalized alarm filtering system disclosed in FIG. 9 is for one flight warning mode and the circuitry must be repeated $m$ times for $m$ independent flight warning modes. The clock system 110 however can drive at least $m$ flight warning mode alarm filtering stages each of which can be filtered with independent parameters.

What is claimed is:

1. A ground proximity warning system for determining the proximity of an aircraft with respect to the ground utilizing flight positional input parameters, comprising:
    means for calculating the position of the aircraft with respect to a plurality of specified flight warning mode envelopes;
    means for providing information on the aircraft's actual position;
    means for comparing said calculated position with said information on the aircraft's actual position during successive sampling periods, and producing predetermined alarm condition signals if the aircraft has penetrated a respective one of said flight warning mode envelopes constituting an alarm condition; and
    filtering means connected to said comparing means for filtering said alarm condition signals and for generating a plurality of alarm generating signals depending upon the alarm condition signal during the continuing flight of the aircraft in comparison with predetermined maximum and minimum alarm condition signal levels; including means for incrementing each flight warning mode alarm condition signal by a constant during each sampling period when said alarm condition is present; means for producing a predetermined one of said alarm generating signals when the predetermined maximum level of said alarm condition signal is reached by the incremented value; means for decrementing said alarm condition signal by a constant during each sampling period when its magnitude is between said maximum and minimum levels and the corresponding alarm condition ceases to exist; and means for resetting said alarm condition signal to zero instantaneously when its magnitude is below said minimum level and said alarm condition ceases to exist.

2. A system as claimed in claim 1 wherein said filter means further comprises means for altering the rate at which said flight warning mode alarm conditions are sampled.

3. A system as claimed in claim 2 wherein said filter means further comprises means for independently changing for each flight warning mode the maximum and minimum levels and the constants of incrementation and decrementation.

4. A system as claimed in claim 3 wherein said filter means further comprises means for completing an audio warning generated when said alarm condition which caused it ceases to exist, and higher priority alarm conditions do not simultaneously exist.

5. A system as claimed in claim 4 wherein said filter means further comprises means for restarting the generation of a lower priority audio warning which has been interrupted by higher priority audio warnings if the responsible lower priority alarm condition still exists when the higher priority alarm generation conditions have disappeared.

6. A system as claimed in claim 1, wherein said filter means further comprises means for changing the maximum and minimum levels.

7. A system as claimed in claim 1 wherein said filter means further comprises means for changing the constant of incrementation and decrementation.

* * * * *